Patented Jan. 30, 1951

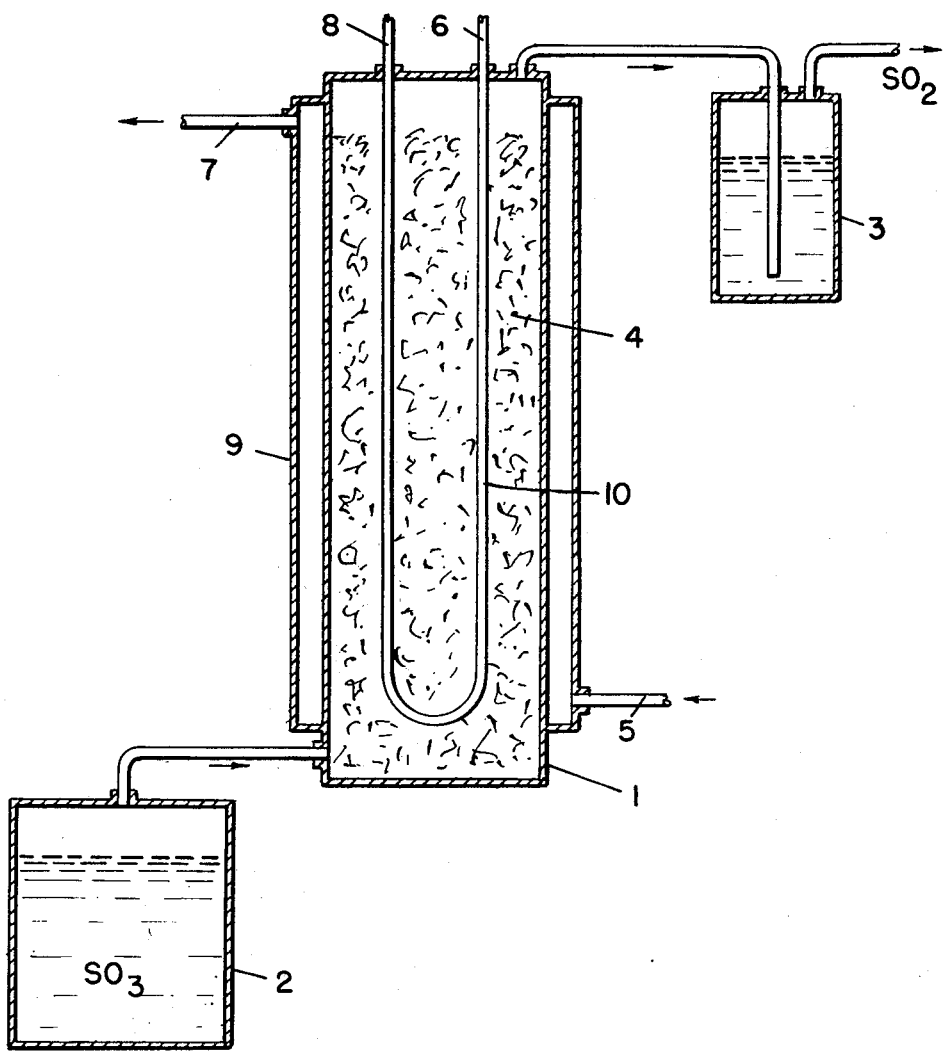

2,539,579

UNITED STATES PATENT OFFICE 2,539,579

PROCESS FOR THE MANUFACTURE OF SULFUR DIOXIDE

August Hecker, Munchenstein, near Basel, Switzerland, assignor to Ciba Limited, Basel, Switzerland, a Swiss firm Application September 24, 1946, Serial No. 698,937
In Switzerland December 6, 1945

3 Claims. (Cl. 23—178)

For many purposes, for example, for the production of liquid sulfur dioxide, it is advantageous or even necessary to have available pure sulfur dioxide, so that in such cases the gases obtained by roasting sulfur-containing ores cannot be used owing to the high content of contaminating gases present therein. It is known that practically pure sulfur dioxide can be obtained from gaseous mixtures containing sulfur dioxide by absorbing the sulfur dioxide from such mixtures by means of substances which permit the sulfur dioxide to be liberated therefrom in a simple manner, for example, tertiary amines and certain other basic substances. Such processes may be especially important where it is a question of removing relatively small quantities of sulfur dioxide and where the requirement for sulfur dioxide is only moderate. When, on the other hand a continuous production of large quantities of sulfur dioxide is necessary, this process has the disadvantage that the absorbent substances must be frequently regenerated, and that considerable losses of these substances, which may in many cases be highly costly, cannot be avoided.

It is also known that sulfur dioxide can be made from sulfuric acid or oleum by the action of a very wide range of reducing agents. Molecular sulfur has been proposed as a reducing agent for this purpose. All these processes have the disadvantage that the reaction leading to the formation of sulfur dioxide must be conducted in liquid sulfuric acid or liquid oleum at a raised temperature.

The present invention is based on the observation that sulfur dioxide can be made in a more advantageous manner by causing gaseous sulfur trioxide to act on solid sulfur.

The gaseous sulfur trioxide required for the present process can be obtained in the usual manner by the distillation of oleum. Apparatus suitable for this purpose has been used in the art for a very long time, since the production of oleum of high percentage strength is carried out by means of gaseous sulfur trioxide. Moreover, the sulfur trioxide undergoes purification when produced by the distillation of oleum, so that the necessary gaseous sulfur trioxide for the present invention is obtained in a sufficiently pure form. If desired, the sulfur trioxide may be transported in suitable containers to the place where it is to be used, and reconverted there into the gaseous condition. In many cases it is of advantage to erect an oleum distillation plant at the place where the sulfur trioxide is to be used or to associate the manufacture of sulfur dioxide by the present invention with an existing oleum factory as a subsidiary manufacture.

In carrying out the process of the invention the gaseous sulfur trioxide may be brought into contact with solid sulfur in any desired manner. A very simple arrangement is, for example, a suitable vertical reaction vessel in the form of a tower or tube which is charged, for example, with pieces of sulfur and through which sulfur trioxide is passed. At the outlet end of the vessel practically pure sulfur dioxide is obtained directly. If desired, traces of sulfur trioxide still present may be removed by washing with concentrated sulfuric acid.

The reaction of the gaseous sulfur trioxide with solid sulfur is of an exothermic character. Consequently, the reaction vessel has to be cooled to some extent in order that the average room temperature shall not increase to a harmful extent, for example above the melting point of the sulfur, but shall vary for example, within a range of the order of 50–100° C. Too intense cooling must be avoided, for otherwise there is a risk that the gaseous sulfur trioxide introduced will condense. In normal operation the pieces of sulfur may be allowed to undergo local heating at the surface up to the melting point.

Ordinary sheet iron may be used for the construction of the reaction vessel, since it will not be attacked by sulfur trioxide or sulfur dioxide at the temperature used and with the exclusion of moisture.

An apparatus by means of which the process of the invention can be carried out is illustrated diagrammatically in the accompanying drawing. 1 is a reaction vessel in the form of a tower, 2 is an apparatus suitable for the production of gaseous sulfur trioxide, 3 is a device for washing the sulfur dioxide produced, for example, a washing flask, 4 represents the charge consisting of pieces of sulfur, 5 and 6 are inlets and 7 and 8 outlets for cooling water, 9 is a cooling jacket, and 10 represents internal cooling means, for example, a cooling coil.

In carrying out the process the apparatus for producing sulfur trioxide is put into operation. The rate of cooling and the rate of introduction of sulfur trioxide are advantageously so adjusted relatively to one another that melting of the pieces of sulfur 4 throughout is avoided with certainty.

There can be obtained, for example, about 160 kilograms of sulfur dioxide per hour per cubic metre of reaction volume with corresponding cooling. The sulfur consumed by the reaction may be replaced from time to time or continuously by charging the reaction vessel 1 through an inlet opening not shown, for example, situated at the top of the vessel.

Whereas the invention has been particularly described with regard to operating conditions, apparatus, etc. to ensure good productivity it is to be remarked that the invention is not restricted thereto. It is obvious that the reaction may be carried out as a batch process instead of a continuous one, that special cooling means may be dispensed with if the generated heat can escape without such cooling means, that the reaction vessel need not be a tower or a tube but may have other shapes if desired, etc.

What I claim is:

1. A process for producing sulfur dioxide, which comprises continuously charging substantially pure gaseous sulfur trioxide into the bottom of a reaction vessel containing lumps of sulfur at a temperature not exceeding the melting point of the latter but above that at which the gaseous sulfur trioxide condenses, whereby substantially complete reaction between the sulfur trioxide and sulfur is realized at such temperature with consequent formation of sulfur dioxide, and continuously withdrawing the sulfur dioxide formed, at the top of said reaction vessel.

2. A process for producing sulfur dioxide, which comprises continuously charging substantially pure gaseous sulfur trioxide from the distillation of oleum into the bottom of a reaction vessel containing lumps of sulfur at a temperature not exceeding the melting point of the latter but above that at which the gaseous sulfur trioxide condenses, whereby substantially complete reaction between the sulfur trioxide and sulfur is realized at such temperature with consequent formation of sulfur dioxide, and continuously withdrawing the sulfur dioxide formed, at the top of the said reaction vessel.

3. A process for producing sulfur dioxide, which comprises continuously charging substantially pure gaseous sulfur trioxide from the distillation of oleum into the bottom of a reaction vessel containing lumps of sulfur at a temperature not exceeding the melting point of the latter but above that at which the gaseous sulfur trioxide condenses, whereby substantially complete reaction between the sulfur trioxide and sulfur is realized at such temperature with consequent formation of sulfur dioxide, and continuously withdrawing the sulfur dioxide formed, at the top of the said reaction vessel, at a rate of about 160 kilograms per hour per cubic metre of reaction volume.

AUGUST HECKER.

REFERENCES CITED

The following references are of record in the file of this patent:

"Inorganic and Theoretical Chemistry" by Mellor, vol. 10 (1930), page 344 and page 184.